(No Model.)  H. GREER.  5 Sheets—Sheet 1.
MACHINE FOR MAKING SPIKES OR NAILS.
No. 505,980.  Patented Oct. 3, 1893.
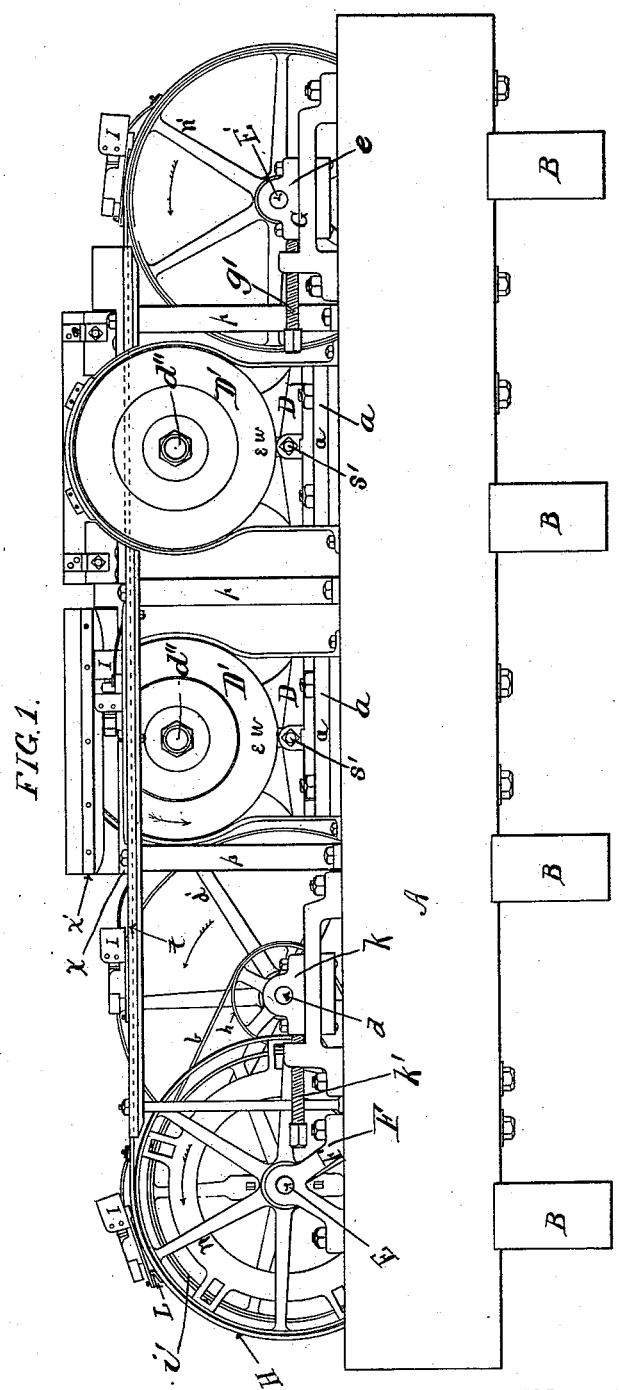
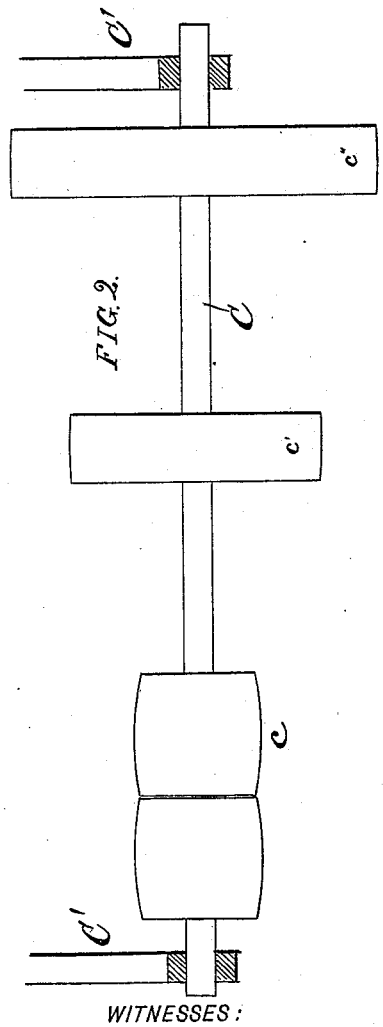
WITNESSES:
W. C. Corliss
J. W. Adams
INVENTOR
Howard Greer
By Coburn & Thacher
ATTORNEYS

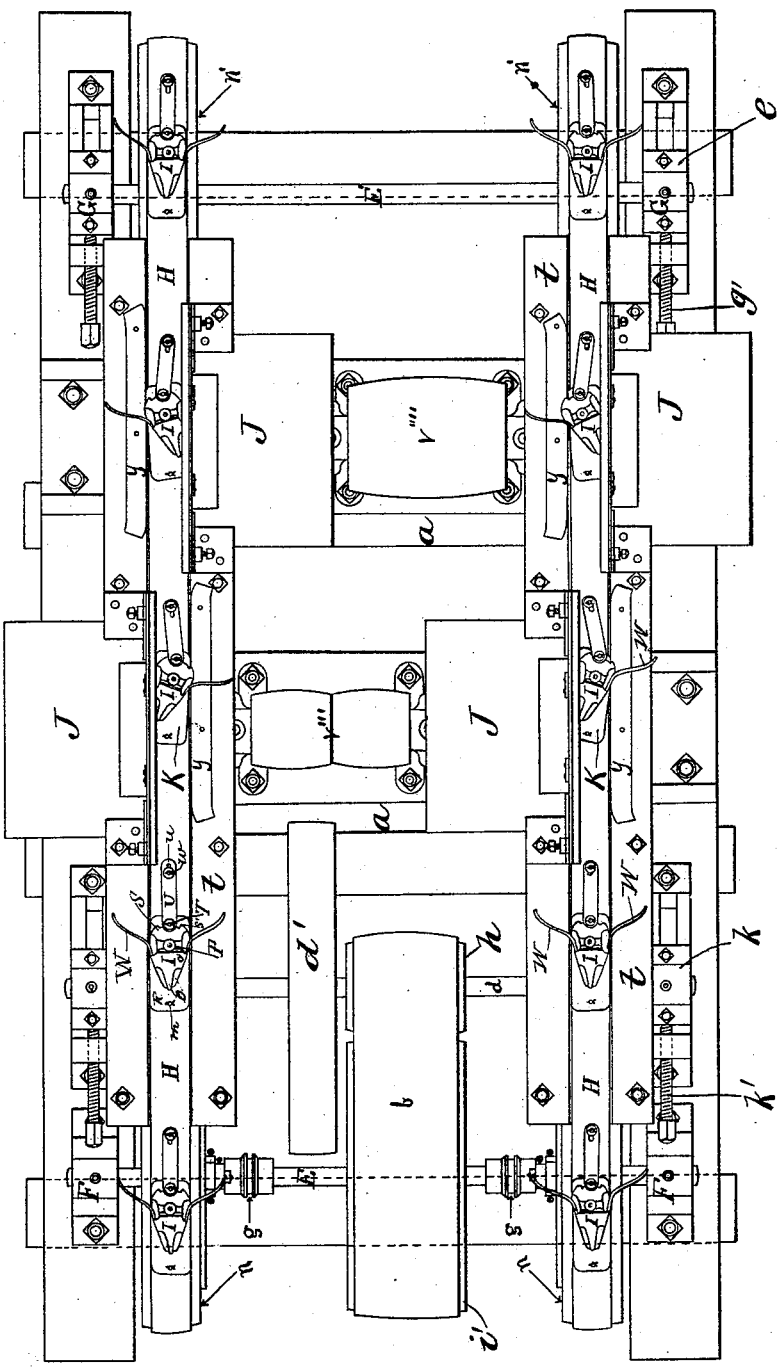

(No Model.) 5 Sheets—Sheet 3.
H. GREER.
MACHINE FOR MAKING SPIKES OR NAILS.
No. 505,980. Patented Oct. 3, 1893.
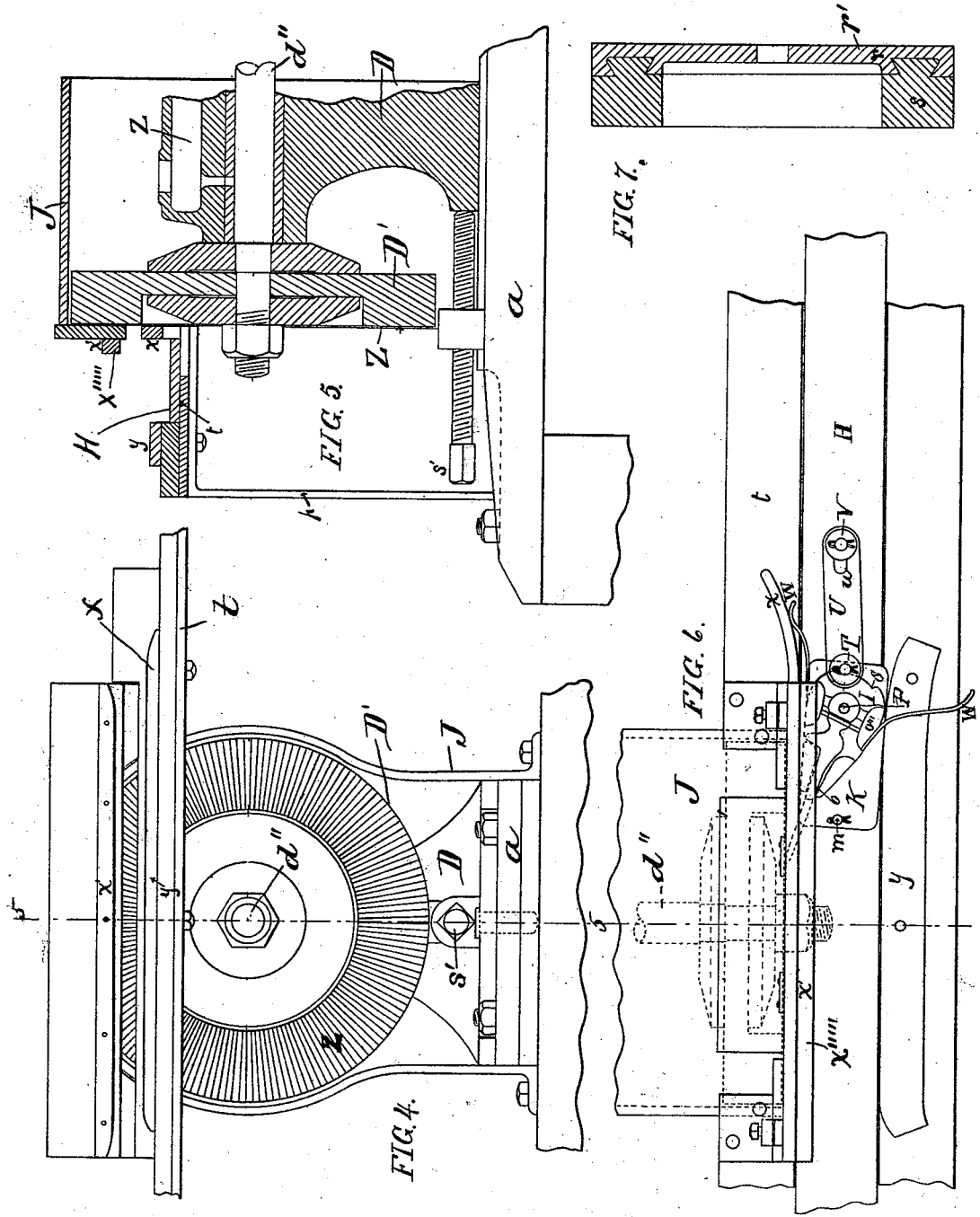
WITNESSES:
W. C. Coolis
J. W. Adams
INVENTOR
Howard Greer
By Johnson Thacher
ATTORNEYS (No Model.) 5 Sheets—Sheet 4.
H. GREER.
MACHINE FOR MAKING SPIKES OR NAILS.
No. 505,980. Patented Oct. 3, 1893.
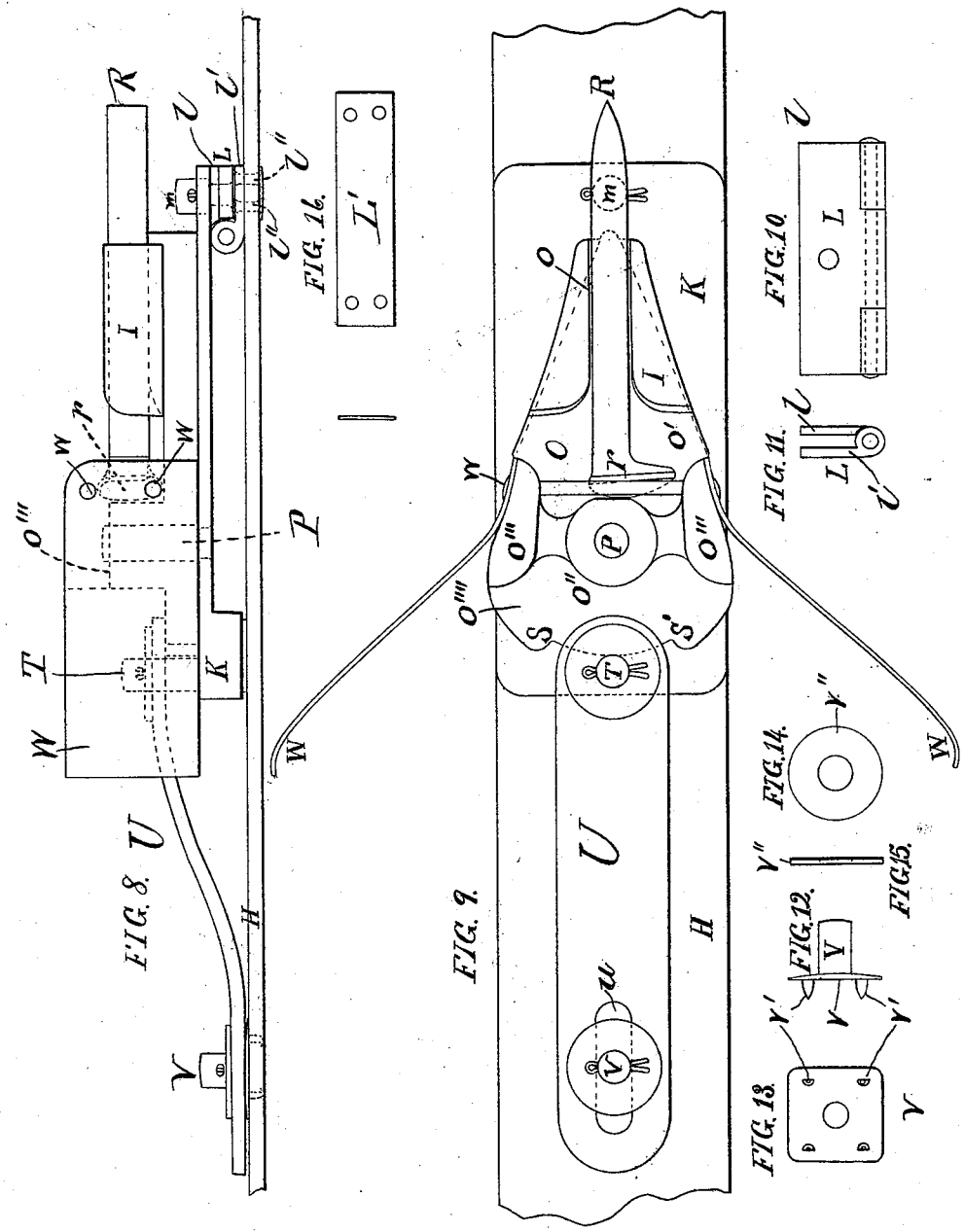
WITNESSES:
W. C. Colice
J. W. Adams.
INVENTOR
Howard Greer
By Coburn & Thacher
ATTORNEYS

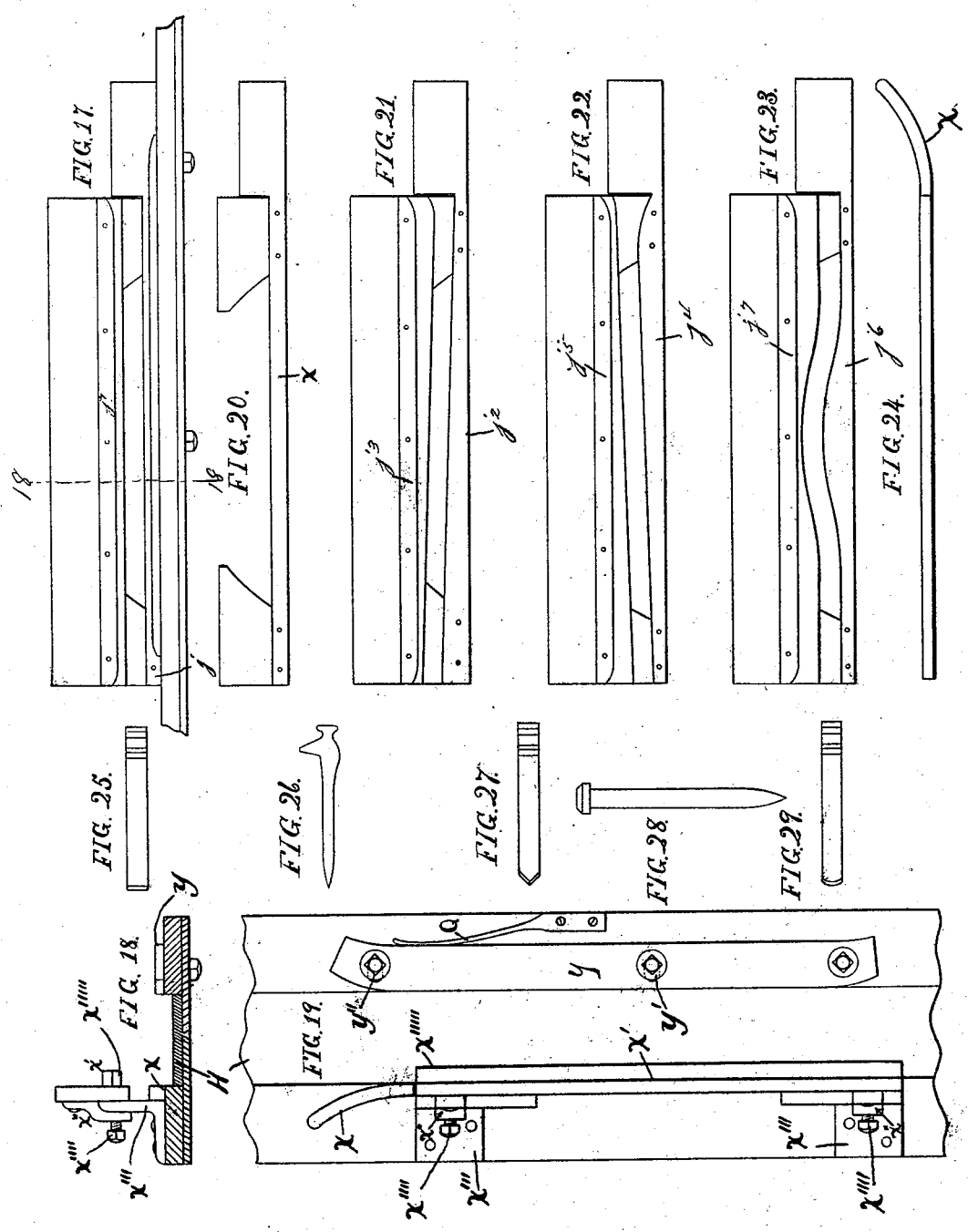

UNITED STATES PATENT OFFICE.

HOWARD GREER, OF CHICAGO, ILLINOIS.

MACHINE FOR MAKING SPIKES OR NAILS.

SPECIFICATION forming part of Letters Patent No. 505,980, dated October 3, 1893.

Application filed March 30, 1892. Serial No. 427,028. (No model.)

*To all whom it may concern:*

Be it known that I, HOWARD GREER, a citizen of the United States, residing at Chicago, in the county of Cook and State of Illinois, have invented certain new and useful Improvements in Machines for Making Spikes or Nails, which are fully set forth in the following specification, reference being had to the accompanying drawings, in which—

Figure 1 represents a side elevation of a double machine embodying my improvements; Fig. 2, a similar elevation of the counter-shaft and pulleys in said machine; Fig. 3, a plan view of the said machine; Fig. 4, a detail elevation of one of the rotary files or grinders and the parts adjacent thereto; Fig. 5, a vertical section of the same, taken on the line 5—5, of Fig. 4; Fig. 6, a detail plan showing the devices for taking the spike and presenting it to the grinder; Fig. 7, a cross-section of one of the emery-wheels; Fig. 8, a detail side elevation of the chuck-holder and part of the chuck-belt; Fig. 9, a plan view of the same; Figs. 10 and 11, plan and end views of the chuck hinge; Figs. 12 and 13, side and bottom views of the pin for holding the chuck bridle; Figs. 14 and 15, plan and edge views of the washer; Fig. 16, a plan view of the burr-plate for riveting the hinge to the belt; Fig. 17, a detail front elevation of table, guide and gage bars; Fig. 18, a cross-section of the same, taken on the line 18—18, of Fig. 17; Fig. 19, a plan view of the same; Fig. 20, a front elevation of the lower guide bar; Fig. 21, a front elevation showing the guide bars under a modified arrangement to grind pyramidal points; Fig. 22, a similar view with the position of the parts reversed; Fig. 23, a front elevation showing the guide bars curved for making curved points; Fig. 24, a plan view of the lower guide bar, detached; Figs. 25 to 29, inclusive, different views of spikes of different forms, which will be hereinafter pointed out more definitely.

Figs. 1, 2 and 3 are upon one and the same scale; the remaining figures are upon a single scale, but considerably enlarged from that of the former, except Figs. 8 to 16, which are upon a scale still further enlarged.

Letters Patent No. 401,346, were granted to me April 16, 1889, for a "method of finishing railroad-spikes;" and Letters Patent No. 455,900, were granted to me July 14, 1891, for a "railway spike," the article being the product of the process set out in the former patent. The said patented process is for a certain method of grinding and tempering spikes and the article also patented is a spike with a hardened cutting edge and soft or untempered body, the product of this process. I refer to the patents themselves for a full description of the said inventions.

My present invention relates to a machine for carrying out the said patented process and automatically producing the said patented product.

At the rear or delivery end of the machine there is a shaft, E, extending across the main frame parallel with the shaft of the grinders and mounted in bearings, F, which are bolted to the side beams A. At the opposite or front end of the machine there is a similar shaft, E', parallel with the shaft E and having its bearing boxes, e, mounted on brackets, G, which are bolted to the side beams A, and the bearings are adjustable on the said brackets by means of setting screws, g'. On the shaft E, just inside its journal-bearings, is a large pulley, n, which is loosely mounted on the shaft and is connected thereto at will by means of any suitable clutch, g; I prefer a friction-clutch for this purpose. On the shaft E', just inside its journal-bearings, is mounted a large pulley, n', similar to the pulley, n, but fast on the shaft. A chuck-belt, H, is mounted on these two pulleys, which are of proper face and diameter to serve as carriers and drivers for the said belt, by means of which the spikes are brought successively to the operation of the grinders and finally discharged at the rear end of the machine.

A table, t, extends lengthwise of the machine running from the top of one pulley n to the top of the corresponding pulley n'. This table is made of thin steel plates constructed in sections, arranged so that the portion or section lying in front of any one of the grinders may be removed without interfering with the rest of the table. The several sections are bolted to angular steel standards, p, seen in Figs. 1 and 5, which standards are secured by bolts to the lateral beams A, as seen in Fig. 1. The table t is of such width that the chuck-belt H may lie upon it, occupying the central portion thereof, and leave sufficient room on each side for the fastening to the table of certain guide bars, x, and gage bars, y. The belt H is of such width—say about three and one-half inches—as to adapt it for the attachment and carrying of holders or chucks, I, which are intended to receive and manipulate the spikes in the finishing process, as will be presently described; the belt may be made of metal or of any known belting material, preferably, however, of a single thickness of leather.

The construction of the holders or chucks I and the devices for attaching the same to the belt, is best seen in Figs. 6, 8 and 9. The base of the holder is a metallic plate or piece, K, about six inches long and three and one-half inches wide, which is connected at one end to the belt, by means of a hinge, L, crossing the same. The end of the plate K is fastened to the upper leaf, l, of this hinge by a pivot pin, m, so that the plate may swing to either side of the belt in a horizontal plane. The lower member, l', of the hinge is fastened directly to the belt by means of a burr-plate, L', placed on the under side of the belt and through rivets, l''. Obviously this hinge connection provides for a certain amount of vertical movement of the plate K.

I will now describe in detail the construction and operation of a machine in which I have carried out my invention in one practical way and the particular improvements which I believe to be new and wish to secure by Letters Patent will be definitely pointed out in claims following the said description.

In the drawings a base or supporting-frame is represented, consisting of two parallel beams, A, lying upon a series of cross-beams, B. Base plates or supports, a, are arranged crosswise of the longitudinal beams A, which they span and to which they are secured by strong bolts. These plates are of any number desired. In the drawings two only are shown, but four or more may be provided, if desired. These plates are to provide bed supports for the attachment of stands which carry arbors or shafts, as will hereinafter be described. The shaft, C, from which the machine is driven is preferably suspended above the machine by suitable hangers, C', and is preferably arranged lengthwise of the machine, or parallel with the lateral beams A of the supporting-frame. The shaft is provided with a pulley c, by which it is driven and with pulleys c', c'', the latter larger than the former, which serve as driving pulleys to certain parts of the machine, as will be hereinafter described.

Upright stands or standards, D, are mounted on the base plates a by a tongue and groove connection, which permits them to be set in and out laterally of the base frame of the machine, which adjustment is accomplished by means of setting screws, s'. These stands carry the grinding stones or rings, D', which are mounted on arbors or shafts, d'', having their bearings in said standards. The adjustment of the standards provides for setting the grinding stones properly to their work in the first instance and also for adjusting them to compensate for wear. When brought into the position desired the stands are secured in place on the base plates by tightening bolts.

The machine shown in the drawings is a double one—that is, it is constructed with two sets of finishing devices, so as to act upon a double set of spikes at one and the same time. This, however, is simply to give capacity to the machine, as the latter may be fitted with only a single set of finishing devices, if desired. In the double machine here shown the finishing devices are arranged respectively on opposite sides of the machine. They are practically duplicates and hence a description of one set only is necessary, but the corresponding parts of each will be designated by the same letters.

The main portion or body, O, of the spike chuck, I, may be made of any suitable metal, either cast or forged, and is of peculiar construction. It is kite-shaped in general contour and its upper surface is cut away to provide a longitudinal groove, o, extending back some distance from the point; behind this groove is an enlarged free space, o', cut away entirely across the body and immediately back of this space is a central boss, o'', and side wings, o''', arranged on edges opposite to the boss, somewhat higher than the latter and extending toward the rear, but with an open space, o'''', between them at the rear of the boss, as seen in Figs. 8 and 9. The rim at the larger circular end of the chuck O is also cut away slightly, so as to provide projections S, S', standing some distance apart, as seen in Fig. 9. The chuck is arranged with its point toward the pivot, m, of the base plate K and is pivoted to the latter near its rear end with a pin, P, upon which it may swing in a horizontal plane. At the rear end of the base plate K there is a vertical pin, T, which rises just back of the chuck O standing in the space between the two projections S, S'; hence it is obvious that the horizontal vibration of the chuck upon its pivot will be limited by these projections coming in contact with said pin. A bridle, U, made of a strip of leather, or sheet metal, is connected at one end to the pin T from which it extends rearward and at its opposite end is provided with a longitudinal slot, u, by means of which it is connected to the belt H, by a pin, V. This pin is constructed with a foot or bottom, v, having projections, v', by means of which it is fastened to the belt and the end of the bridle lies between this foot and a washer, v'', over which is inserted a spring cotter. A similar washer is placed upon the pin T above the bridle and a spring cotter inserted above. The inner end of the bridle extends inward over the rear of the chuck O, as seen in Figs. 8 and 9 of the drawings, and so prevents the chuck O from falling away from the base K when the chuck belt is inverted in its circuit. The bridle also secures the base plate K to the belt H, by means of the pins T and V and the slot $u$. This jointed connection permits both horizontal and vertical movement of the base plate K with reference to the belt, but at the same time such vibration will be limited by the said connections; sufficient freedom is given to the parts, however, to accomplish the grinding, as hereinafter described, and in connection with the hinges L to allow the chucks to smoothly pass around the pulleys $n$, $n'$, as the belt H performs its circuit. Springs, W, are fastened to the outside of the respective wings $o'''$, or sides of the chuck O. These springs are secured at one end by means of through bolts or rivets, $w$, passing from one side to the other of the chuck and arranged one above the other, as seen in Figs. 8 and 9. The springs extend to the rearward and outward from their points of attachment, as seen in Figs. 3, 6 and 9, and are left free at their outer ends. The groove $o$ in the chuck is adapted to receive the spike, R, which is placed therein point foremost, the head, $r$, lying back in the free space $o'$ and between the rivet bolts $w$, by which and the boss $o''$, it is stopped and held in position.

The grinding stones D' are arranged with their faces alternately inward and outward with reference to the machine and with the planes of their faces a little distance apart, so that the belt H may run between them. At each grinder there is a pair of spike guides, $x$, $x'$; the lower guide $x$ is permanently fixed to the table $t$, while the upper one $x'$ is provided with a loop or hook, $x''$, Figs. 18 and 19, by which it is set upon the upper edge of a short upright standard $x'''$, so as to stand directly over the lower guide $x$. This mounting of the guide $x'$ may be entirely loose or there may be a loose fastening provided by a screw-pin $x''''$, passing through a slot in the hook, the object being to leave the upper guide $x'$ free to rise and fall. In the operation of the machine the front end of the spike passes between these two guides, the upper one resting upon the spike, and this vertical movement of the upper guide provides for use with spikes of different sizes without adjusting the guides for each change in width of the same. The upper guide $x'$ lying on the spike as it passes by the grinding stone, steadies the point during the operation of grinding which is accomplished as the end of the spike is carried across the cutting faces of the grinding stones, and for this purpose this guide may have a horizontal rib or flange, $x'''''$, projecting over the spike. The gage bars $y$ are adjustable to and from the cutting faces of the grinding stones and may also be set either parallel with said faces or at an angle thereto. This adjustment is for the purpose of regulating the grinding pressure; if a gage bar is set parallel with the cutting face of a grinder, the grinding pressure will be uniform throughout the cut, but if set oblique thereto, so that the intervening space will be gradually narrowed, the base K of the chuck I will be pressed gradually closer to the face of the grinding stone and so the grinding pressure on the spike will increase during the passage of the latter across the face of the stone; and if this relative position of the gage bar and grinder be reversed, so that the space between them will gradually widen from front to rear, obviously the pressure of the spike on the grinding stone will gradually decrease throughout its passage across the same. The lower guides $x$ lie in the plane or path of the springs W, as they are carried along past the same by the chuck belt, while the gage bars $y$ are just below this plane. When one of the chucks is brought to the entrance of a space between a gage bar and a grinder, the spring W on the side next to the latter comes in contact with the guide $x$, and thereby swings the chuck I upon its pivot to turn the front end or point of the spike in against the face of the grinder, as seen in Fig. 6, which movement is permitted by the arrangement of the gage bar $y$ below the plane of these springs, so that the one on the opposite side of the chuck will swing out over the gage.

A shaft, $d$, is set parallel to the shaft E, being mounted in bearings, $k$, which are adjustable to and from the shaft E by means of set-screws, $k'$, as seen in Figs. 1 and 3. On this shaft there are fixed pulleys $d'$ and $h$, and a belt $b$ is passed over the latter and a larger pulley, $i'$, fixed on the shaft E. The pulley $d'$ on this same shaft is driven at the required speed from any convenient source, thereby rotating the shaft $d$ and so communicating motion to the shaft E through the belt $b$; obviously then whenever the pulleys $n$ are clutched to the shaft E, the required movement will be communicated to the chuck belts.

The operation is as follows: The counter-shaft C, being driven at proper speed from any convenient source, transmits motion, by quarter-turn belts passing over the pulleys $c'$, $c''$, to the pulleys $v'''$ and $v''''$ on the grindstone arbors, thereby rotating the latter in the direction of the arrows, seen in Fig. 1. At the same time longitudinal movement is given to the chuck belts B from the shaft $d$, as described above, whereby the belts are caused to pass along by the faces of the grinding stones from front to rear of the machine, and, of course, carry with them the chucks or holders I which are fastened thereto. When a chuck I is brought up to the top of the pulley $n'$, as seen in Fig. 1, a spike is dropped into it in the position shown in Fig. 9; then as the belt H brings this chuck and spike to the entrance of the space between the first grinder and its gage bar, as seen in Fig. 6, outer spring W coming in contact with the curved end of the guide $x$ swings the chuck upon its pivot until the point of the spike is brought in between the guides $x$, $x'$ and against the cutting face of the grinder. This movement throws the base K of the chuck I against the gage bar y, as seen in Fig. 6, and in this position the spike is carried across the face of the grinder and one side of its point is ground. The springs W are wider than the space between the guides x, x' and, therefore, slide upon these bars and so are held away from the cutting face of the grinders as they pass by them. Now as the grinders are arranged alternately on opposite sides of the carrying belts, as already explained, when a spike chuck has passed by the first grinder, mentioned above, and the spring is released from compression, the chuck will swing back into normal position on the belt, and, as it is brought to the next grinder, the spring on the opposite side of the chuck will swing the latter, so as to present the opposite side of the spike point to the second grinder, the operation being precisely the same as that just described, except that the grinding is done on the opposite edge of the spike point. It will be seen then that the spike point is ground first on one side and then on the other and that any number of grinding stones may be employed, odd or even as may be desired; I prefer to use four grinders for each chuck belt. As heretofore stated the machine shown in the drawings is a double one—that is, a chuck belt and set of grinders is arranged on each side of the machine, so that two sets of spikes may be finished at the same time on a single machine, thus increasing the capacity of the latter. After passing the last grinder in the set the spikes are removed from the chucks as the latter descend on the pulleys n, being taken out and packed by hand, or dropped automatically into kegs, or other suitable receptacles, placed under the pulleys n, when it is not desired to protect the points by careful packing.

The grinding wheels may be of any emery or corundum composition, or they may be of steel of the construction generally known as a rotary file, such as seen at Z in Figs. 4 and 5. I prefer, however, a corundum or emery wheel, as seen at s Fig. 7, secured by a dovetail joint to a metallic base or chuck, r', as seen in said figure.

It will be noticed that the grinding is done on the side or flat part of the stones or files. This simplifies the taking up of the wear of the grinding wheels and secures a uniform speed of the cutting surfaces, whereas grinding on the circumference of grinding wheels or stones, reduces the diameter thereof and necessitates speeding up of the arbors to compensate for the wear.

The speed at which the grinding is done is sufficient to heat the point of the spike or spike blank to what may be called a tempering heat—say about cherry red; but it is done so quickly that only a small portion of the spike point or edge is brought to a red heat, the main body or portion of the spike remaining almost cold. Therefore as soon as the ground spike leaves the grinder the thin point, which alone is heated, cools suddenly, a portion of the heat passing into the surrounding air and the remaining portion being quickly taken up and drawn away from the point by the cold body of the spike, the result being a wood-cutting temper at the point or edge of the spike sufficient to stand up against the resistance of very hard wood and hard knots in soft wood.

The object of placing the driving counter-shaft C at right angles to the axes of the grinders, with quarter-turn driving belts from one to the other, is to simplify the driving mechanism and also to provide a ready take-up for the belts when the arbors of the grinding stones are moved to compensate for the wear of the latter. If counter-shafts, parallel with the said arbors, were used, a separate shaft with complete hangers and individual drivers would be necessary for each grind stone arbor; and, furthermore, provision would have to be made on the counter-pulleys for any considerable wear of the stones to keep the pulleys in line with the pulleys on the arbors in the necessary adjustment of the latter. In the arrangement described above one counter-shaft serves for an entire set of grinders and the adjustment to take up wear of the latter is not sufficient to materially disturb the action of the driving belts.

Some minor features are shown in the drawings which may or may not be used. In Fig. 5 there is shown a large cavity, z, in the journal bearing, which is for the reception of oil, for lubricating the arbor of the grind stone. In this receptacle the oil is completely protected from all dirt and grit and as the cavity has a small opening to the arbor, clean oil will always be supplied to the latter.

In order to impart a sensitive contact of the spike point with the cutting faces of the grinders, a spring, Q, may be placed against the outer edge of the gage bar y, as seen in Fig. 19, in which case the two bolt holes y', y'' in the bar nearest to the said spring must be elongated, so as to allow the bar to swing horizontally on the remaining bolt at the other end thereof as a pivot; in this construction the nuts on the bolts are not turned up tightly, so that the bar will swing freely.

In Figs. 3 and 4 there is shown a protection casing, J, of boiler plate fastened at its lower ends to the frame of the machine and extending up and over the entire grinding stone, so as to entirely inclose the latter, except below. This covering is arranged so close to the stone as to prevent injury by flying fragments in case of bursting the stone.

The shape and size of the spike chucks or holders must, of course, be changed to conform to the shape and size of the spike which is to be pointed; and when it is desired to grind only one side of a spike point, a machine provided with one or more stones on one side only of the chuck belt will perform the work. I prefer, however, to grind both sides of the spike points, as I believe it makes a better article.

Modifications may be made in the guides $x, x'$, whereby a variety of spike points may be ground; some such modifications are shown in the drawings. In Fig. 17 these guides $j\,j'$ are shown as set parallel with the table $t$; in this arrangement spikes with points, as shown in Figs. 25 and 26, are produced. In Figs. 21 and 22, the guides $j^2 j^3$ and $j^4 j^5$ respectively are arranged with alternate pairs set obliquely to the table $t$ and reversed with respect to each other; this arrangement produces a pyramidal point, as shown in Fig. 27. In Fig. 23 curved guides $j^6 j^7$ are shown, in which the spike point follows a curved groove between the guide bars and so is swung up and down in its passage across the face of the grinder; with this construction a curved point is obtained, as shown in Fig. 29. These various means of carrying the spike points across the cutting faces of the grinders I contemplate as within my invention, as the main principle of the machine, whereby the automatic grinding and tempering of the spikes are effected, is still retained.

In the construction herein described and shown the chuck belts H have a continuous motion in one direction. This, however, may be modified if desired, it being necessary only that the belts are given a suitable movement to bring the points of the spikes into the required contact with the grinders at the proper time; and changes may be made in the particular construction of the chucks and other details of the machine, provided the automatic grinding and tempering of the spikes or nails are effected by the single machine.

Having thus described my invention, what I claim as new, and desire to secure by Letters Patent, is—

1. In a machine for finishing spikes or nails, a series of grinders, in combination with a mechanism for automatically bringing the spikes to said grinders, and mechanism for automatically turning the spikes laterally to their line of forward travel to present the point end only of each to the grinding surfaces, substantially as described.

2. In a machine for finishing spikes or nails, a series of grinders, in combination with a carrier moving along past said grinders, spike holders or chucks mounted on said carriers and vibratable laterally thereon, and mechanism whereby said chucks may be vibrated laterally to present the points of the spikes to the grinders, substantially as described.

3. In a machine for finishing spikes or nails, a series of grinders arranged alternately in different parallel planes and with their grinding faces opposed, in combination with a carrier arranged to travel longitudinally between the opposing sets of grinders, laterally vibratable spike holders mounted on said carriers, and mechanism whereby said holders are vibrated automatically and alternately from side to side to present the points of the spikes alternately to the grinders on opposite sides of the carrier, substantially as described.

4. In a machine for finishing spikes or nails, a series of revolving grinders, having the grinding surfaces upon the sides thereof, in combination with an endless belt arranged to travel along the sides of said surfaces, a series of spike holders or chucks attached to said belt by hinge connections which permit both lateral and vertical vibration thereof, and devices for automatically vibrating the said chucks laterally, substantially as described.

5. In a machine for finishing spikes or nails, a series of revolving grinders, in combination with a mechanism for automatically bringing the spikes to said grinders, and mechanism for automatically presenting the points of the spikes to the grinding surfaces, driving mechanism for imparting the required motion to the carrier, and separate driving mechanism for rotating the grinders, substantially as described.

6. In a machine for finishing spikes or nails, a series of revolving grinders, having their cutting faces on the sides thereof, in combination with an endless carrier belt H, spike holders or chucks O connected to said carrier by a vertical pivot to permit lateral vibration, springs W extending outward and inclining away from the sides of said holder, and guides arranged in the path of said springs at each grinder, whereby the holders are automatically vibrated to turn the points of the spikes against the cutting surfaces of the grinders, substantially as described.

7. In a machine for finishing spikes or nails, an endless spike carrying belt H, in combination with a base K attached to the belt by hinge joints which permit both vertical and lateral vibrations thereof, and the spike holder or chuck O connected to said base plate by a vertical pivot which permits lateral vibration of the chuck, and mechanism for automatically vibrating the said spike holder or chuck as it is carried forward by the belt, substantially as described.

8. The endless carrying belt H, in combination with the cross hinge L, provided with vertical pin $m$ on one leaf, the base plate K pivoted at one end to said pin, the pivoted bridle U connecting the other end of said plate to the belt, and the spike holder O pivoted by a vertical pin P to said plate, substantially as described.

9. The revolving grinders D', in combination with the carrier belt H, the laterally vibratable spike holders O mounted on said carriers, and guide bars $x, x'$ arranged on the front side of each grinder and adapted to receive the point of the spike between them when turned in against the cutting face of grinders, substantially as described.

10. The revolving grinders D', having their cutting faces arranged upon one side thereof, in combination with a pair of guide bars $x, x'$, arranged along the front of each grinder, adapted to receive the point of the spike between them and the upper one free to move vertically, substantially as described.

11. The revolving grinders D', provided with cutting faces on one side, in combination with a pair of guide bars $x, x'$, arranged one above the other in front of each grinder, a gage bar $y$ arranged opposite each lower guide bar, a carrier H, and a laterally vibrating spike holder O mounted on the carrier, substantially as described.

12. The grinders D', in combination with the guide bars $x, x'$, arranged in front thereof, the gage bars $y$, the carrier H, the laterally vibratable spike holders O mounted thereon, and the side springs W fastened to the holder at the sides thereof and with their free ends arranged to come in contact with and slide along the said guide bars to vibrate the holders, substantially as described.

13. The grinders D', in combination with the carrier belt H, base plates K pivoted thereto, spike holders O pivoted to said plates, guide bars $x, x'$, gage bars $y$ connected at their rear ends to their support by fixed pivots about which they have a limited lateral vibration, and springs Q arranged to act upon the front ends thereof, substantially as described.

HOWARD GREER.

Witnesses:
 CARRIE FEIGEL,
 A. M. BEST.